April 21, 1959     I. W. RUDERMAN     2,883,547
COMBINED SCINTILLOMETER AND FLUORIMETER
Filed Nov. 4, 1955
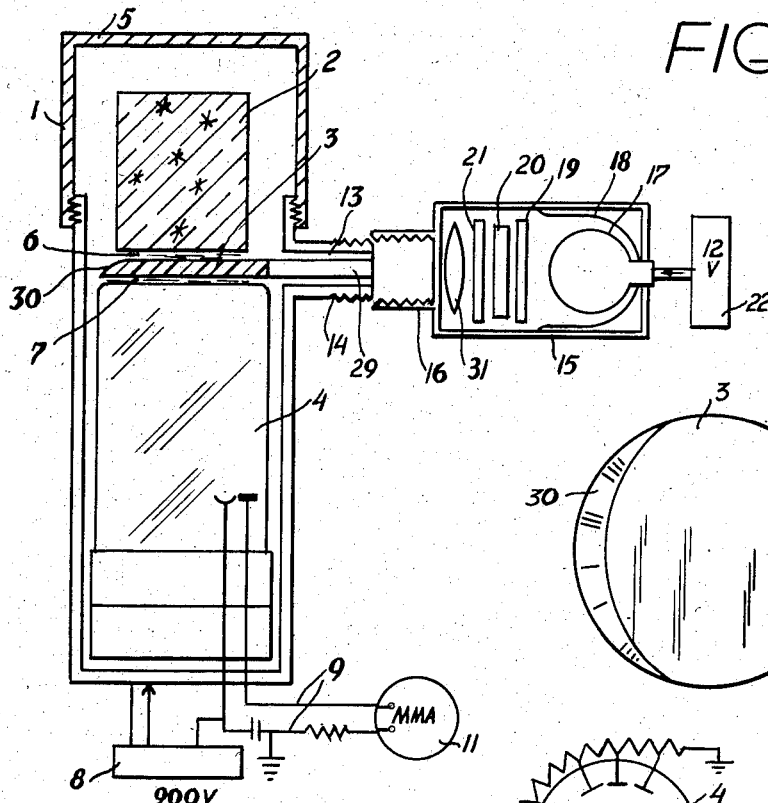
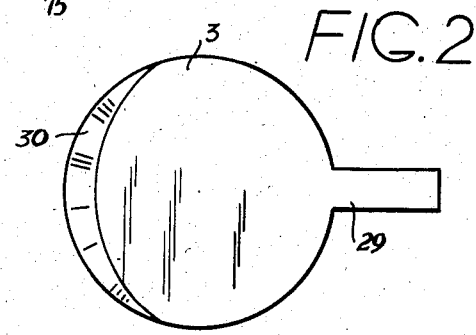
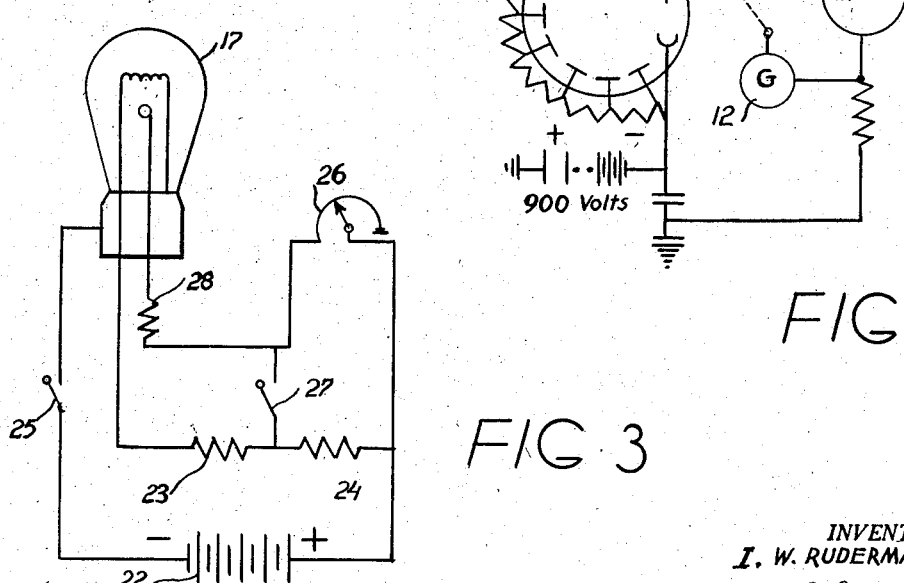
INVENTOR:
I. W. RUDERMAN
BY J. W. Schmied
ATTORNEY

United States Patent Office 2,883,547
Patented Apr. 21, 1959

2,883,547
COMBINED SCINTILLOMETER AND FLUORIMETER

Irving W. Ruderman, Demarest, N.J., assignor to Isomet Corporation, Palisades Park, N.J., a corporation of New Jersey Application November 4, 1955, Serial No. 544,881

6 Claims. (Cl. 250—71)

This invention relates to means, methods and instruments for measurement of radioactivity and fluorescence wherein these measurements may be made separately by a single instrument.

It is frequently desirable to measure radioactivity and fluorescence successively in fairly rapid succession and for certain purposes in remote places where a minimum of equipment is a prime consideration. A photomultiplier tube is an effective and useful element for making both radioactivity and fluorescence measurements. In instruments for making such measurements the photomultiplier tube is the most expensive element of the equipment and frequently requires a large proportion of the total cost.

Consequently, an object of the invention is creation of a practical, compact, and portable device which may serve both as a scintillometer or radiation meter and also as a fluorimeter in which a photomultiplier tube and certain other parts serve in common as an essential element for each function.

A general object is the provision of a single instrument for measuring both radioactivity and fluorescence.

A further object is the provision of a single instrument whereby a positive qualitative and quantitative determination of the uranium content of a mineral may be made.

A further object is the provision of a single instrument whereby mineral samples which are both radioactive and fluorescent when fused in a suitable melt, may be distinguished from mineral samples which are radioactive and manifest little or no fluorescence when similarly fused.

A further object is the production of an instrument which may be used to determine uranium content of a mineral qualitatively or quantitatively, or both, as distinguished from thorium content.

A further object is the production of an instrument in which a light transmitting medium serves the common purpose of transmitting fluorescent light from one source, for example, a radiation activated phosphor, to a photoresponsive electrical tube, and fluorescent light from another radiation activated phosphor to the same photoresponsive electrical tube without uncoupling the phosphor from the tube.

Features of the invention are the novel combinations and arrangements of means whereby the foregoing objects are achieved. Other objects and features will appear from the following description of an exemplary embodiment of means including the invention taken in connection with the accompanying drawings, in which:

Fig. 1 is a cross-sectional semi-diagrammatic view of the novel physical elements of an exemplary embodiment with certain well known parts such as power supplies and a counting rate meter diagrammatically indicated;

Fig. 2 is a view, looking from the top of Fig. 1 of the Lucite or equivalent light pipe and coupler;

Fig. 3 is an exemplary circuit diagram for the ultraviolet lamp which is a part of the exemplified invention; and Fig. 4 is a schematic of the circuit connections of the photomultiplier tube and counting rate meter and a micro-ammeter connectable alternatively by a switch.

In the drawings, a main casing 1 of thin aluminum or other suitable metal contains a scintillating phosphor 2, a Lucite coupling element 3, and an electronic photomultiplier tube 4. The scintillating phosphor 2 may be one of many known such as an alkali metal iodide activated with a fraction of a percent of thallium, anthracene, or any one of a number of other solid inorganic or organic phosphors which meet the conditions set forth below. The phosphor may be mounted in the upper part of the casing 1 by known means. For this and other reasons the casing may be made in two or more sections. The top part 5 may also be separable. Such details are well within the realm of ordinary mechanical skill. For light transmission from the phosphor 2 to the Lucite element 3 the two may be coupled for light wave transmission by a layer 6 of transparent viscous material such as a silicone fluid of high molecular weight. The Lucite member 3 is in turn coupled to the photocathode face of the photomultiplier tube 4 by a similar layer 7 of transparent material.

The casing 1 may extend down over the sides of the photomultiplier tube to the bottom or to any suitable distance. The tube is provided with its usual type of base and connections for the supply of power to its various elements. In a portable device for use in remote places the power may be derived from compact batteries. Other sources may be used. Usage is generally for only small periods of time and quite intermittent so that dry cells are adequate. The output circuit 9 is connected to a microammeter 11 or to a scaler for indicating the number of scintillations or total fluorescence per unit of time.

The casing 1 may be of aluminum or magnesium and is provided with an opening 13 provided with means such as a short externally threaded tube 14 for fixed and light proof attachment of a casing 15 which is provided with a short internally threaded tube 16. The casing 15 contains an ultraviolet lamp bulb 17, which is mounted in a reflector 18 and with a primary filter 19, a sample 20 (to be described), and a so-called interference filter 21.

The general construction of the casing 15, lamp 17, reflector 18, filters 19 and 21, and specimen 20 and the manner of mounting them removably in a light-tight manner in the casing 15 are known but will be briefly reviewed here. The lamp 17 may be any suitable ultraviolet lamp, for example, a four watt lamp requiring a power supply of about twenty-eight volts. The lamp bulb is quite close to the filter disc 19. The disc 19 is a non-fluorescent glass filter passing wave lengths near to, for example, 3450 A. or somewhat more or less. A filter sold by the Corning Glass Company designated No. 5874 will serve. The sample 20 is a thin disc of material to be examined and may be made as hereinafter described. It is fluorescent under the influence of ultraviolet light of the wave length or wave lengths passed by filter 19 and is transparent to its produced ultraviolet light. According to Stokes' law, fluorescence under the influence of electro-magnetic radiation results in emission of longer wave length, hence the light output is longer wave length light. Consequently, the filter 21 is such as to pass light near to or around 5550 A. and wholly or largely absorb or suppress light passed by the filter 19. A light concentrating lens 31 may be provided in a known type of mounting but its use may be optional.

The sample 20 may be prepared in a known manner as described, for example, by Grimaldi and Levine in U.S. Geological Survey Bulletin 1006, published in 1954, although the general procedure was previously known. In brief, it consists in taking a small sample of ore and melting it in a flux consisting of about one part of sodium fluoride and about five parts each of sodium carbonate. Such sample in and of itself constitutes a phosphor if and when it contains proper elements to make it fluorescent.

The power supply and circuit arrangement of the lamp 17 is diagrammed in Fig. 3. Source 22 may consist of a suitable number of dry cells in series of parallel-series arrangement. Other suitable sources may be used. The circuit per se is known. Source 22 is connected in series with resistances 23 and 24 and the heated element of the lamp through switch 25 which is open in the idle position and closed in use. A variable portion of resistor 26 shunts resistor 24 when the start switch 27 is closed and the fixed end of resistor 26 extends to the cold element of the lamp through a resistor 28. In use, when switch 27 is closed, switch 25 is closed to start the discharge through the lamp and switch 27 may then be opened. Resistor 26 may be varied to vary the light output.

The circuit diagrammed in Fig. 4 is conventional and needs little description as the manner of connecting a high voltage operating source and an output device to the numerous electrodes of a photomultiplier tube 4 is well known. The photomultiplier tube typifies, in general, an electronic device whose output is controlled by light incident upon a light sensitive electrode through a light admitting window.

The Lucite element 3 consists of a main body portion with a projecting position 29 of suitable length which lies in the threaded tube 14 or may even extend outwardly beyond the end of tube 14. For the more convenient assembly of the parts the casing 1 may be composed of suitable sections (of which two are shown) with light-tight joints. The end 30 of the Lucite element 3 may be curved as shown in Figs. 1 and 2 and the curved surface may be metallized to more effectively reflect light entering through tube 14 toward the lower surface of element 3 through which it is transmitted by coupling 7 onto the photocathode of tube 4. This curvature is not strictly necessary but is advantageous. It may be replaced by a flat sloping surface or the edge may be vertical. It is not necessary to obtain maximum focusing of the light from the filter 21 into the photomutiplier because it has more amplification than necessary. Only a fraction of the light need be collected.

For using the device for detecting fluorescence due to gamma rays, X-rays or other penetrating radiation which are intermittent, the device may be used as a scintillometer.

One may place a portion of ore or other specimen, for example, an ore thought to contain uranium, near to the thin aluminum top 5. Minerals containing uranium and certain others, for example, thorium, will excite the crystal 2 into fluorescence. The intensity of the fluorescence may be indicated by closing switch 10 to the rate meter 12. The rate meter 12 shown as a galvanometer may consist of an amplifier and other devices which are of a known type to indicate the rate of scintillations.

Having determined that the specimen is radioactive, a sample disc may then be made by the process described above or other suitable known method. The apparatus may be then employed to determine the degree of fluorescence under ultraviolet light. After the lamp 17 is lighted and the apparatus is adjusted, the fluorescence of the sample may be determined. The ultraviolet light of wave length 3450 A., for example, excites the sample 10 into fluorescence at higher wave lengths. The filter 21 may select and transmit wave lengths around 5550 A. into Lucite member 3 through the end 29. The light is projected upon the photocathode of tube 4 with a resultant increase of current which may be measured by microammeter 11 to which switch 10 is closed. One may ask why some of the light entering Lucite body 3 does not enter into and excite the phosphor 2 into fluorescence because it is known that quanta of ultraviolet light do excite such phosphors. The reason is that to create fluorescent light the exciting light must be of shorter wave length than the fluorescent emission of the phosphor. Thus with a phosphor of potassium iodide, sodium iodide or caesium iodide (each activated with thallium) the fluorescent emission is mostly around 4000 A. Because this wave length is shorter than 5500 A. the phosphor 2 is not significantly excited and remains non-luminescent. Moreover, it is obvious that the sample 20 is also radioactive but the casing 15 may be made of heavy brass and the filter 21 thick enough to stop most of the gamma radiation. Also the sample of radioactive ore employed to make the phosphor 20 is small, hence its radioactivity is quite slight. Also such waves as gamma waves mostly tend to travel in straight lines and will pass through Lucite body 3 and out to the left with little or no deflection into phosphor 3. Therefore, the fluorescence, if any, caused by the radioactivity of the sample 20 in phosphor 2 is minor compared to the effect of the lamp 17 on sample 20 and this minor effect, if at all significant, may be taken into account by adjusting the zero scale of microammeter 11 before the lamp 17 is energized. If the sample contains uranium the disc sample 20 fluoresces; many other minerals which will excite the phosphor 2 do not fluoresce under ultraviolet light in the form of a fluxed sample 20, for example, thorium does not. By suitably calibrating both the flux meter and the scintillometer with known quantities of known substances, quantitative determinations may be made with exactness.

The tube 4 and its battery supply functions for either tests and hence does double duty as does also the Lucite coupling member 3.

Moreover, by unscrewing the casing 15 from the casing 1 and placing a tight screw cap over the opening, the scintillometer may be used separately in the laboratory or field as a separate instrument in the ordinary way. Also, when the casings 1 and 15 are coupled together, the instruments may be used separately on any substance for either test regardless of the other.

There is thus disclosed an instrument whereby one may make two necessary tests to determine whether a body contains uranium and its quantity in contradistinction to other radioactive minerals whereas one single test is insufficient except in the case of a comparatively rare type of mineral containing uranium which is radioactive and also fluorescent in the natural state.

The word "light" is used herein in the physical sense of radiation in or near the visible spectrum.

The exemplary embodiment as described is illustrative of the principles involved but embodiments of the invention are not limited to the physical forms shown and may be of any form within the scope of the appended claims.

What is claimed is:

1. A photosensitive discharge tube having a photocathode, a coupling member transparent to light optically coupled to the photocathode, a phosphor, a path for transmission of fluorescent light from said phosphor to said coupling member, means for retaining in a fixed position a second phosphor fluorescing at higher wave length than first phosphor, a path from said fixed position for transmission of light from said position to said coupling member, the said coupling member being transparent to both said fluorescent lights and output means for said tube for indicating one or more characteristics of said fluorescent lights separately.

2. A combined scintillometer and fluorimeter including a main phosphor and a light sensitive cathode, said phosphor being coupled to transmit light directly to said cathode, means defining a space for the location of a second phosphor fixed with relation to said main phosphor, and means defining a light conducting path from said space to said cathode, said path including an element presenting to said light a substantial solid angle of reflection.

3. A subcombination comprising a fluorescence operated device including a transparent non-fluorescent coupling member having a body portion comprising essentially a cylinder, means for supplying one kind of fluorescent light into one end of said cylinder, said cylinder having an elongated projection from one side thereof, and means for supplying another kind of fluorescent light to said cylinder through said projection.

4. A light tight casing including in physical arrangement in the order named, a phosphor, a transparent coupling member, a light sensitive electrical tube and having a photocathode and a light admitting window, the light admitting window of said tube being turned toward said coupling member, a second light tight casing coupled into said first casing adjacent to said coupling member and enclosing a light transmitting path from its interior to said coupling member and, in succession away from said path, a filter for transmitting selectively only fluorescent light to which said phosphor is negligibly responsive, means defining a closed space for retaining a disc of specimen to be examined for fluorescence, a filter selectively passing into said space activating radiation for which said specimen is to be examined for fluorescence, and a source of radiation including radiation of wave lengths passed by said last named filter.

5. An instrument comprising a photomultiplier tube and its associated power supply, two separate and independent light input paths to said tube, each said path being shielded from extraneous light, means in said instrument for retaining a fluorescent crystal, one of said paths being from said crystal to said tube, and means in said instrument for retaining a fluorescent body capable of producing radiation independently of said crystal, said other path extending from said fluorescent body to said tube independently of said crystal.

6. An instrument for identifying a mineral containing uranium as distinctive from minerals containing only other elements emitting gamma rays, which comprises a casing including a phosphor fluorescing under the influence of gamma rays and a photo-responsive electronic tube responsive to such fluorescence, means in said casing for applying radiation in or near the visible spectrum to said electronic tube independently of said phosphor, mounting space for a specimen prepared from said mineral under test, a source of ultra-violet light, and means for applying said ultra-violet light to said specimen.

References Cited in the file of this patent

UNITED STATES PATENTS

| | | |
|---|---|---|
| 2,593,206 | Short | Apr. 15, 1952 |
| 2,727,154 | Goldsworthy | Dec. 13, 1955 |